United States Patent
Moellers

(10) Patent No.: US 12,482,376 B2
(45) Date of Patent: Nov. 25, 2025

(54) INTERMEDIATE AXIS THEOREM DEMONSTRATION DEVICE AND METHOD OF USE

(71) Applicant: Lucas Moellers, Hutchinson, MN (US)

(72) Inventor: Lucas Moellers, Hutchinson, MN (US)

(*) Notice: Subject to any disclaimer, the term of this patent is extended or adjusted under 35 U.S.C. 154(b) by 470 days.

(21) Appl. No.: 18/138,784

(22) Filed: Apr. 25, 2023

(65) Prior Publication Data
US 2024/0363024 A1 Oct. 31, 2024

(51) Int. Cl.
*G09B 23/10* (2006.01)

(52) U.S. Cl.
CPC .................................... *G09B 23/10* (2013.01)

(58) Field of Classification Search
CPC ...................................................... G09B 23/10
See application file for complete search history.

(56) References Cited

U.S. PATENT DOCUMENTS

| | | | | |
|---|---|---|---|---|
| 3,083,497 A | * | 4/1963 | Novak | A63H 33/40 40/421 |
| 3,441,274 A | * | 4/1969 | Collins | A63B 37/0001 473/569 |
| 3,887,182 A | * | 6/1975 | Breslow | A63F 7/066 446/179 |
| 4,523,757 A | * | 6/1985 | Swett | A63B 43/04 473/126 |
| 5,192,212 A | * | 3/1993 | Kim | G09B 27/00 434/300 |
| 5,314,368 A | | 5/1994 | Cheng | |
| 5,437,579 A | * | 8/1995 | Salvino | A63B 37/10 473/126 |
| 5,846,088 A | | 12/1998 | Reichert | |
| 6,478,582 B1 | * | 11/2002 | Daw | G09B 23/10 434/300 |
| 2014/0208848 A1 | | 7/2014 | Krylov | |

FOREIGN PATENT DOCUMENTS

| | | |
|---|---|---|
| CN | 103971564 | 8/2014 |
| CN | 205354477 | 6/2016 |
| CN | 111667745 | 9/2020 |

OTHER PUBLICATIONS

YouTube video titled, Dzhanibekov effect on Earth by Bjab that was published on Dec. 17, 2016 and available online at https://www.youtube.com/watch?v=LFlqo_7ZhqE (Year: 2016).*

* cited by examiner

*Primary Examiner* — James S. McClellan

(57) ABSTRACT

An intermediate axis theorem demonstration device for teaching the intermediate axis theorem includes an object, an actuator, and a levitation module. The object has a primary, secondary axis, and intermediate axes of rotation, each having moment of inertia with that about the intermediate axis being greater than that about the secondary axis and less than that about the primary axis of rotation. The actuator is releasably engageable to the object to initiate rotation of the object about its intermediate axis. The object is selectively positionable upon the levitation module, which counteracts a gravitational force upon the object to maintain the object in a substantially fixed position while rotating about its intermediate axis of rotation. An observer thus can observe rotation of the object about its intermediate axis of rotation and intermittent 180° rotation of the object about its primary axis of rotation.

15 Claims, 8 Drawing Sheets

INTERMEDIATE AXIS THEOREM DEMONSTRATION DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to demonstration devices and more particularly pertains to a new demonstration device for teaching the intermediate axis theorem. The intermediate axis theorem explains what can be perceived as an unexplainable rotation of an object having primary, secondary, and intermediate axes of rotation. Lack of a viable demonstration device impedes understanding of the intermediate axis theorem.

(2) Description of Related Art Including Information Disclosed Under 37 CFR 1.97 and 1.98

The prior art relates to demonstration devices but does not teach a demonstration device relevant to the intermediate axis theorem. Moreover, the unique characteristics of demonstrating this theorem have proven difficult to replicate under regular gravitational forces.

BRIEF SUMMARY OF THE INVENTION

An embodiment of the disclosure meets the needs presented above by generally comprising an object, an actuator, and a levitation module. The object has a primary axis of rotation, a secondary axis of rotation, and an intermediate axis of rotation. A moment of inertia about the intermediate axis of rotation is greater than a moment of inertia about the secondary axis of rotation and less than a moment of inertia about the primary axis of rotation. The actuator is releasably engageable to the object to initiate rotation of the object about its intermediate axis of rotation. The levitation module is configured to counteract a gravitational force upon the object. The object is selectively positionable upon the levitation module, whereupon the object maintains a substantially fixed position relative to the levitation module while rotating about its intermediate axis of rotation. An observer proximate to the levitation module is positioned to observe rotation of the object about its intermediate axis of rotation and intermittent 180° rotation of the object about its primary axis of rotation.

Another embodiment of the disclosure includes a method of demonstrating the intermediate axis theorem. Steps of the method are engaging an object to an actuator, actuating the actuator to initiate rotation of the object about its intermediate axis of rotation, positioning the object upon a levitation module, releasing the object from the actuator, and observing rotation of the object about its intermediate axis of rotation and intermittent 180° rotation of the object about its primary axis of rotation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
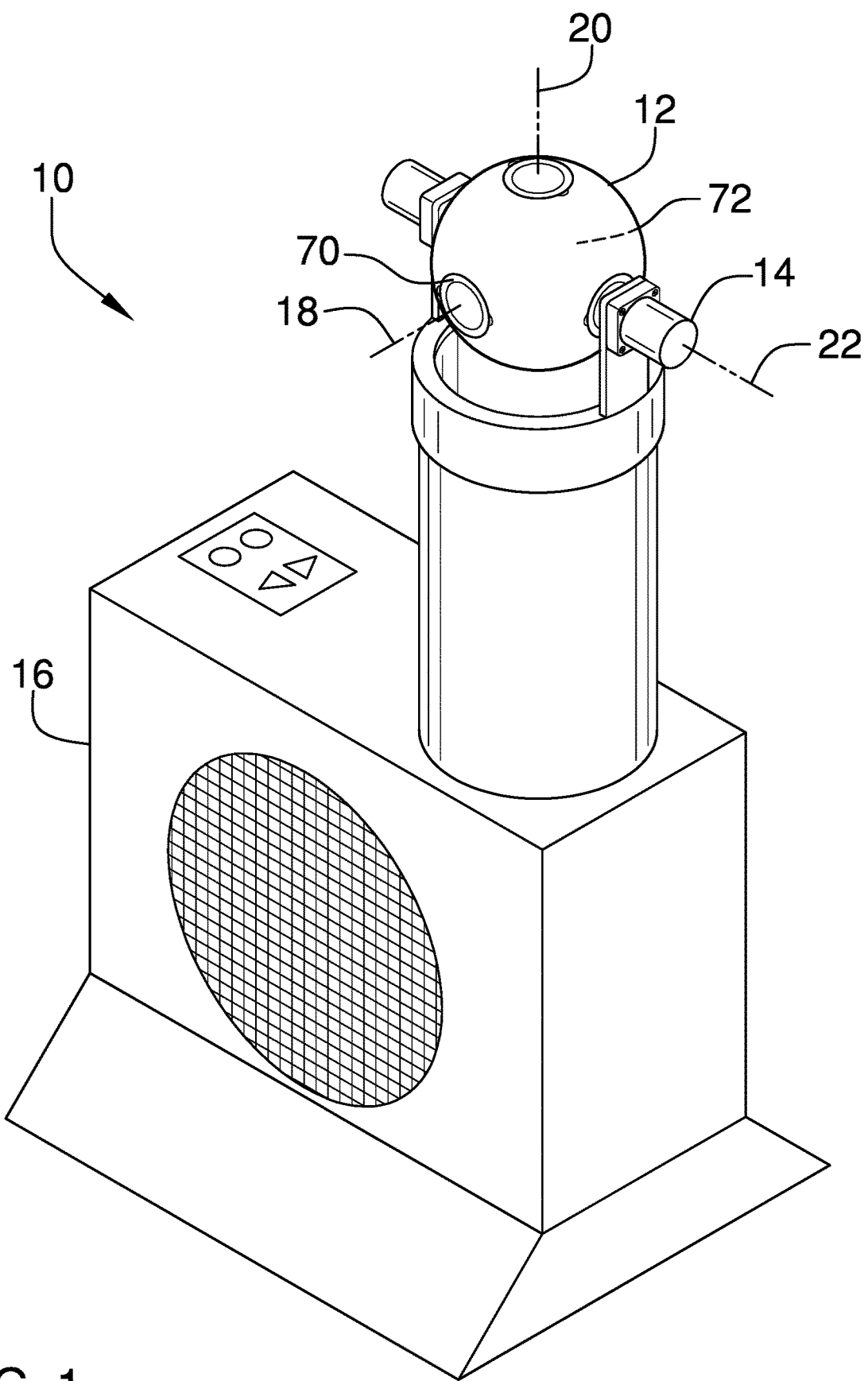
FIG. 1 is a front isometric perspective view of an intermediate axis theorem demonstration device according to an embodiment of the disclosure.

With reference now to the drawings, and in particular to FIGS. 1 through 8 thereof, a new demonstration device embodying the principles and concepts of an embodiment of the disclosure and generally designated by the reference numeral 10 will be described.

As best illustrated in FIGS. 1 through 8, the intermediate axis theorem demonstration device 10 generally comprises an object 12, an actuator 14, and a levitation module 16. The object 12 has a primary axis of rotation 18, a secondary axis of rotation 20, and an intermediate axis of rotation 22. A moment of inertia about the intermediate axis of rotation 22 is greater than a moment of inertia about the secondary axis of rotation 20 and less than a moment of inertia about the primary axis of rotation 18. The object 12 may comprise a shell 24, which defines an interior space 26 and which is substantially spherical. As will become apparent, the object 12 being spherical minimizes asymmetric interactions of the object 12 with an air column 34 in which it is positioned and allows it to be held within the air column 34 according to the Bernoulli's principle. The interior space 26 may be substantially occupied by foamed elastomer to increase the structural integrity of the object 12.

The actuator 14 is releasably engageable to the object 12 to initiate rotation of the object 12 about its intermediate axis of rotation 22. The levitation module 16 is configured to counteract a gravitational force upon the object 12. The object 12 is selectively positionable upon the levitation module 16, whereupon the object 12 maintains a substantially fixed position relative to the levitation module 16 while rotating about its intermediate axis of rotation 22. An observer proximate to the levitation module 16 is positioned to observe rotation of the object 12 about its intermediate axis of rotation 22 and intermittent 180° rotation of the object 12 about its primary axis of rotation 18. The intermediate axis theorem demonstration device 10 provides a valuable teaching aid in explaining the intermediate axis theorem.

In one embodiment of the invention, as is depicted in FIGS. 1-7, the levitation module 16 comprises a blower 28 and the actuator 14 comprises a pair of motors 30. Though it should be understood that a single motor could be utilized as well. A tube 32 is attached to and extends perpendicularly and upwardly from the blower 28. The blower 28 generates an air column 34 to counteract the gravitational force upon the object 12. In addition to the levitation module 16 being aerodynamically driven, the present invention also anticipates the levitation module 16 being magnetically driven, electrostatically driven, acoustically driven, and optically driven. Additionally, the tube 32 could be clear with the object 12 levitating upon the air column 34 within the tube 32.

Figure 2:
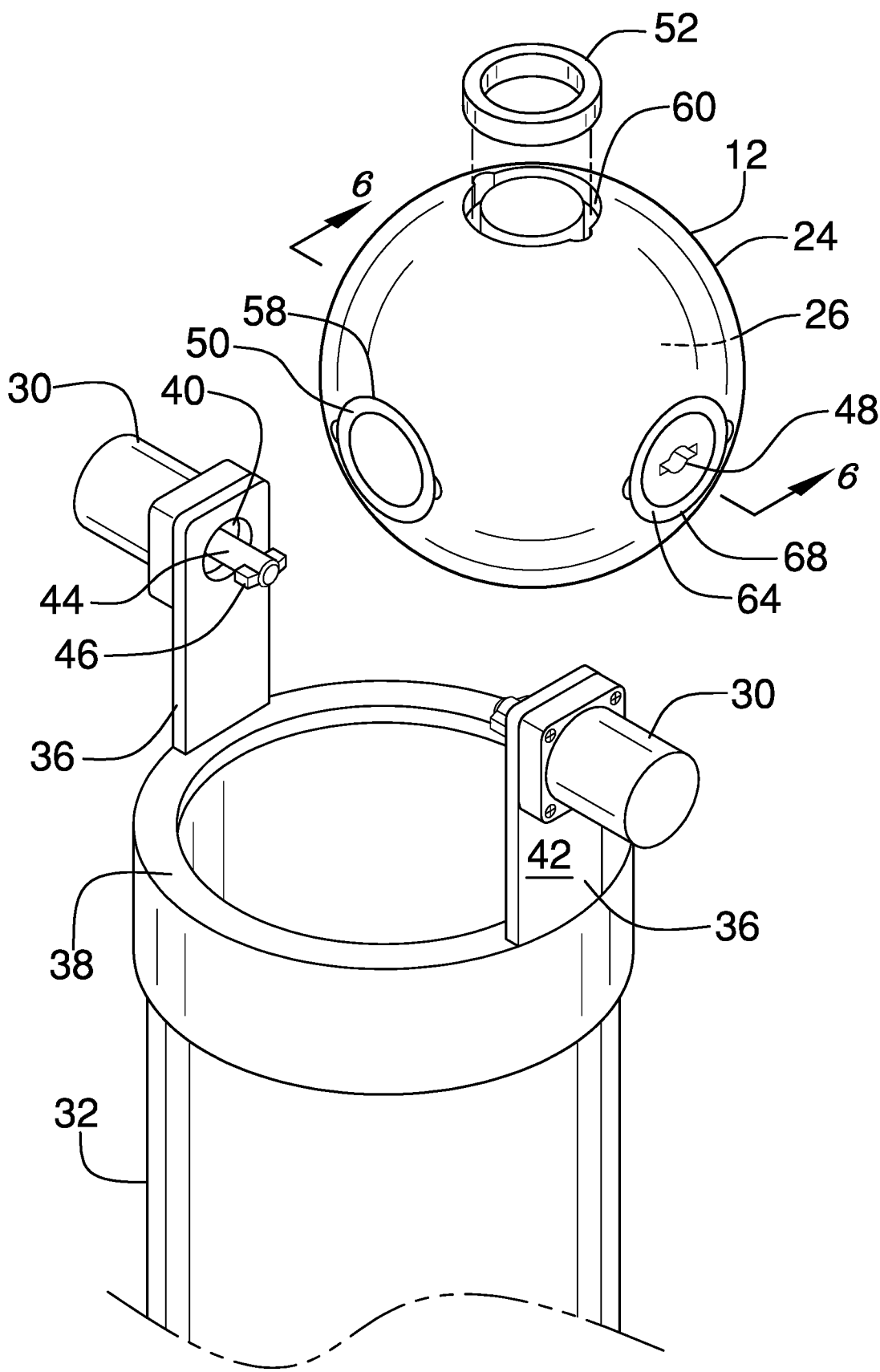
FIG. 2 is a detail view of an embodiment of the disclosure.
Figure 3:
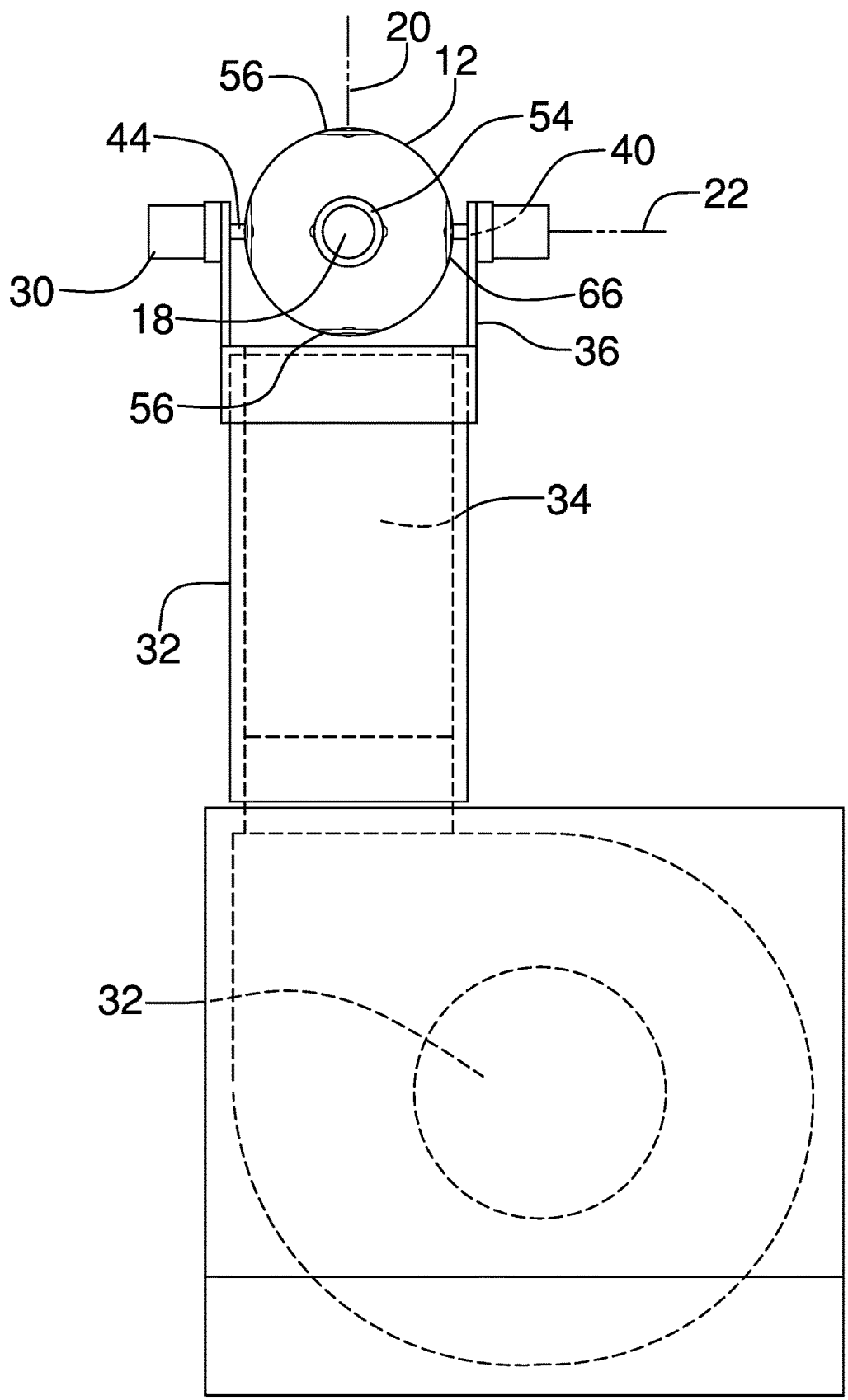
FIG. 3 is a rear view of an embodiment of the disclosure.
Figure 4:
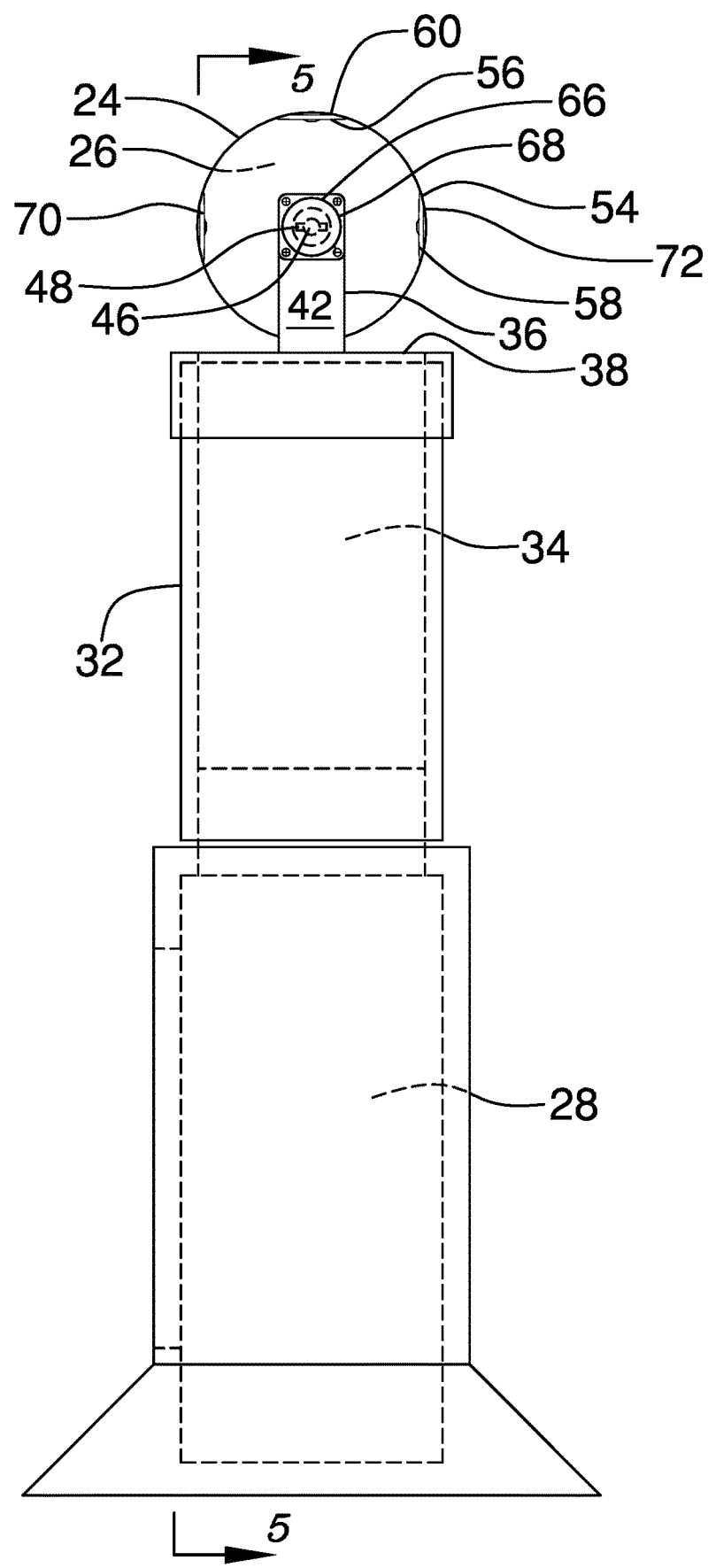
FIG. 4 is a side view of an embodiment of the disclosure.
Figure 5:
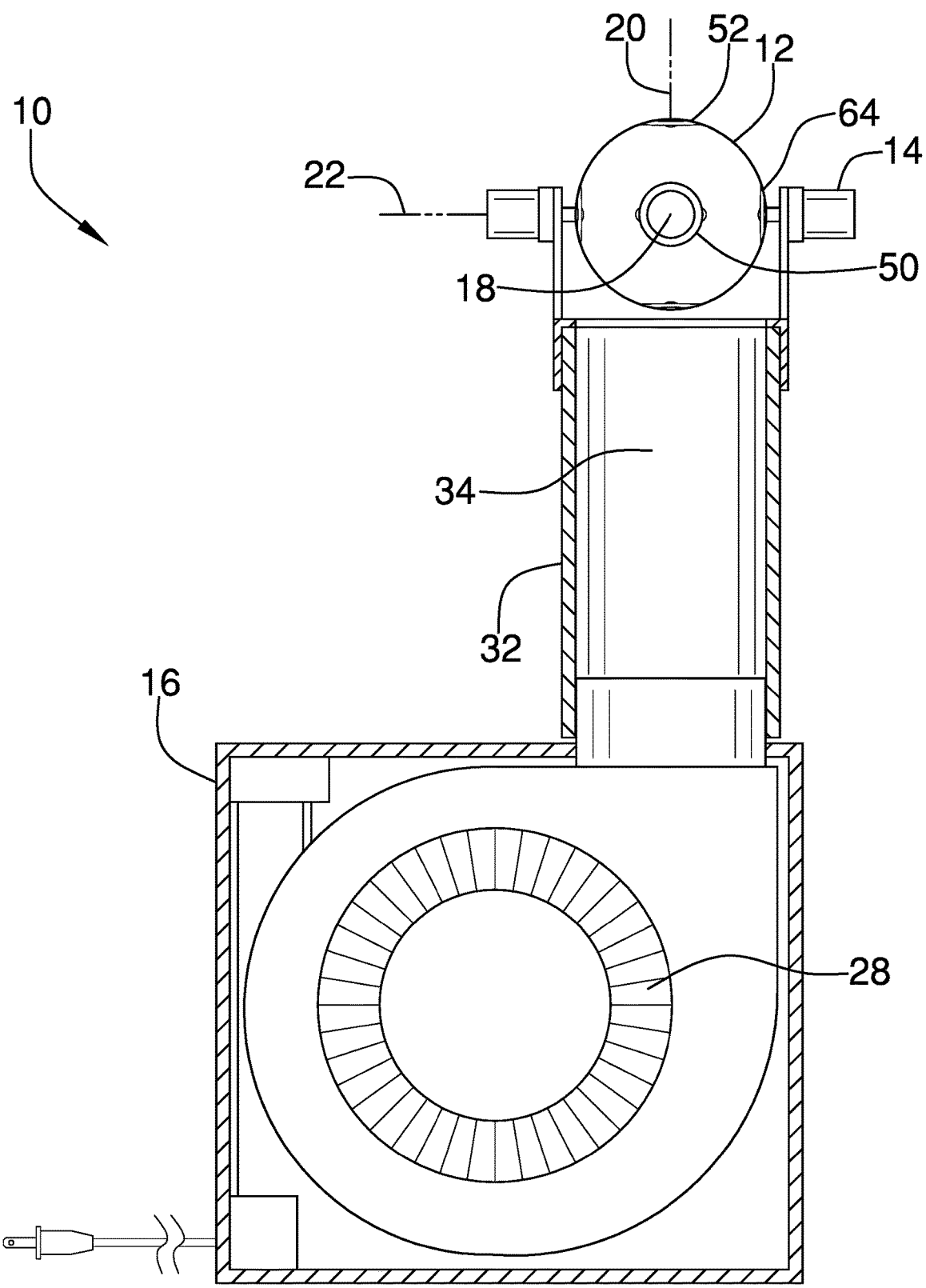
FIG. 5 is a cross-sectional view of an embodiment of the disclosure.
Figure 6:
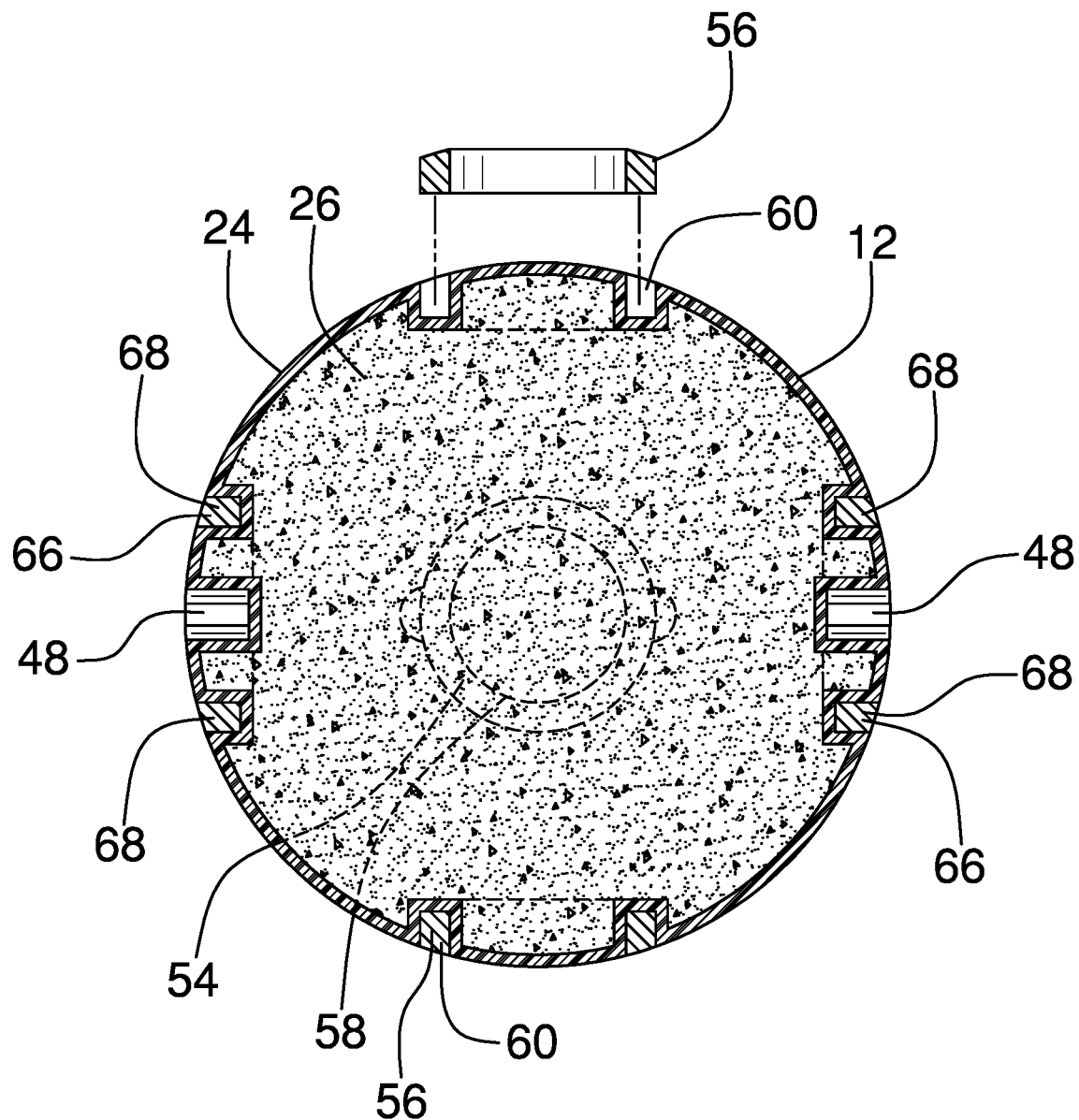
FIG. 6 is a detail cross-sectional view of an embodiment of the disclosure.
Figure 7:
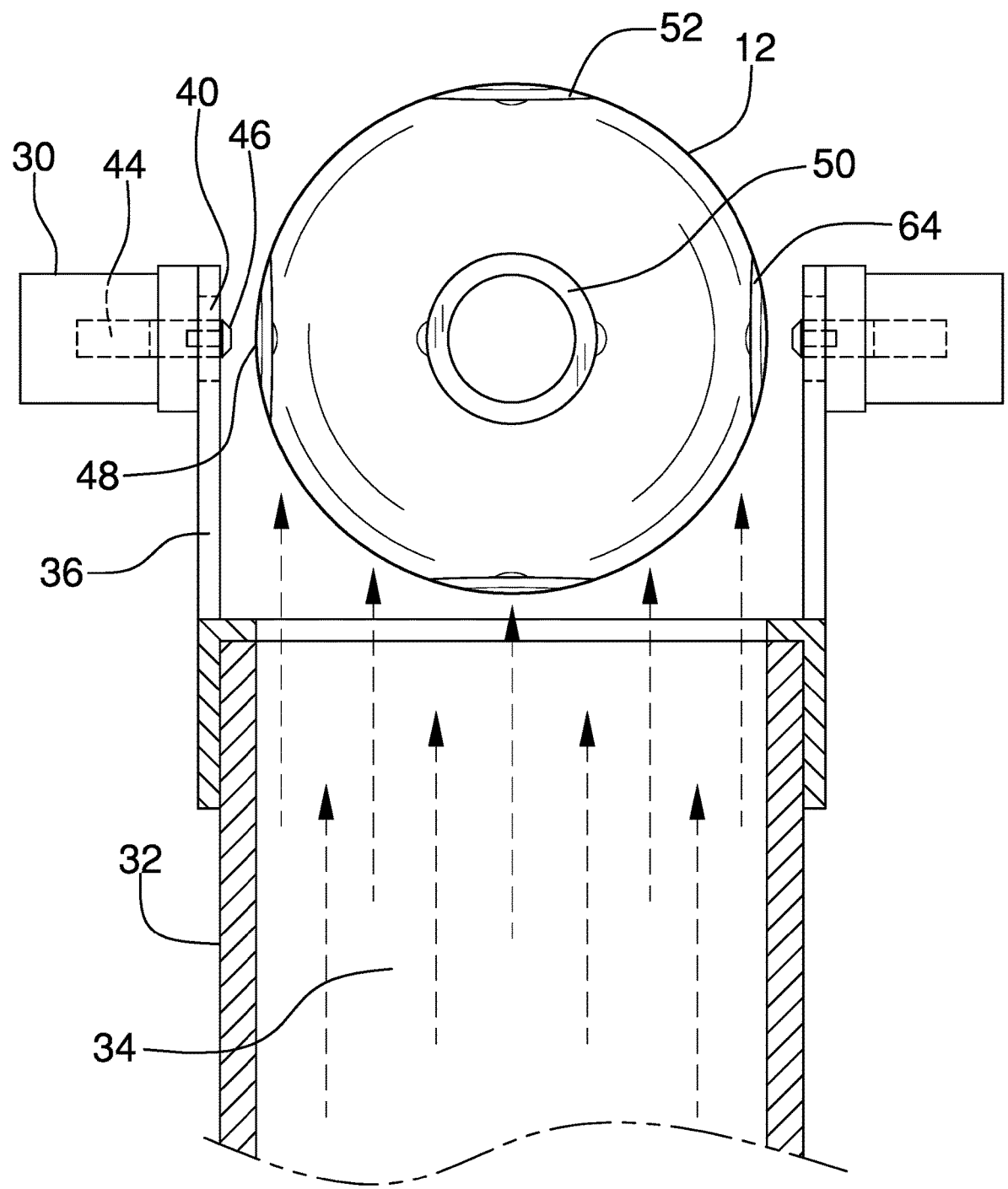
FIG. 7 is an in-use view of an embodiment of the disclosure.
Figure 8:
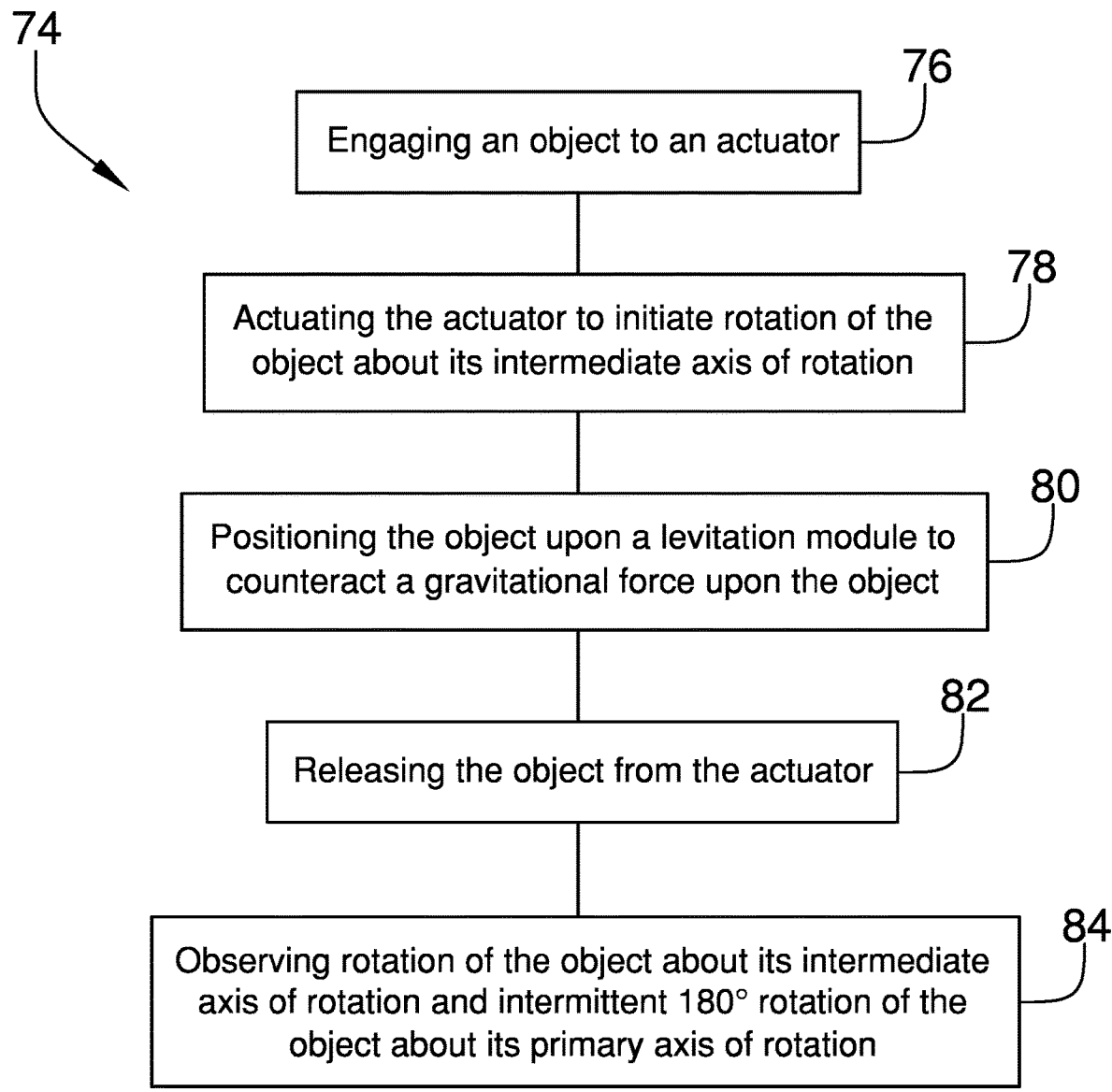
FIG. 8 is a flow diagram for a method utilizing an embodiment of the disclosure.

A pair of brackets 36 extends upwardly from a top 38 of the tube 32, with the brackets 36 being opposingly positioned on the tube 32. Each bracket 36 has a hole 40 positioned therein. The motors 30 are attached singly to the brackets 36 so that each bracket 36 has a motor 30 attached to its outer face 42. Each motor 30 has a shaft 44 that is selectively extensible from the motor 30 through the hole 40 in the bracket 36. A pair of bits 46 is attached singly to the shafts 44 distal from the motors 30. As is shown in FIG. 2, the hole 40 in the bracket 36 is sized such that the bit 46 does not protrude from the bracket 36 upon retraction of the shaft 44.

The object 12 has a pair of slots 48 extending into its exterior surface 62. The slots 48 are opposingly positioned in the object 12 along the intermediate axis of rotation 22 and are shaped complementarily to the bits 46. Rotation of the object 12 about its intermediate axis of rotation 22 is achieved by extension of the shafts 44 and insertion of the bits 46 into the slots 48, followed by sequentially actuating the motors 30 and retracting the shafts 44. The object 12 maintains the substantially fixed position relative to the levitation module 16 by action of the air column 34 directed from the tube 32 onto the object 12. The object 12 rotates about its intermediate axis of rotation 22 with intermittent 180° rotation about its primary axis of rotation 18.

The present invention anticipates the actuator 14 comprising other actuating means for inducing rotation of the object 12, such as, but not limited to, a pair of rotating electromagnets, an airfoil attached to and slightly extending from the object 12, or the like.

The primary axis of rotation 18 may be defined by a pair of first weights 50, which are attached to the object 12 and opposingly positioned on the object 12 along the primary axis of rotation 18. Similarly, the secondary axis of rotation 20 may be defined by a pair of second weights 52, which are attached to the object 12 and opposingly positioned on the object 12 along the secondary axis of rotation 20. One or more of the first weights 50 and the second weights 52 may be selectively attachable to the object 12.

In one embodiment, the pair of first weights 50 comprises a plurality of first attachments 54 and the pair of second weights 52 comprises a plurality of second attachments 56. Each first attachment 54 has a respective mass so that the plurality of first attachments 54 comprises first attachments 54 having a variety of masses. Each second attachment 56 has a respective mass so that the plurality of second attachments 56 comprises second attachments 56 having a variety of masses. The object 12 has a pair of first cutouts 58 and a pair of second cutouts 60 extending into its exterior surface 62. The first cutouts 58 are opposingly positioned in the object 12 along the primary axis of rotation 18 and are shaped complementarily to the first attachments 54. The second cutouts 60 are opposingly positioned in the object 12 along the secondary axis of rotation 20 and are shaped complementarily to the second attachments 56.

Each first attachment 54 is selectively insertable into a respective first cutout 58 to attach it to the object 12 substantially flush with the exterior surface 62 of the object 12. Each second attachment 56 is selectively insertable into a respective second cutout 60 to attach it to the object 12 substantially flush with the exterior surface 62 of the object 12. The first attachments 54 and the second attachments 56 allow for selective generation of a variety of moments of inertia for the primary axis of rotation 18 and for the secondary axis of rotation 20.

The intermediate axis of rotation 22 may be defined by a pair of third weights 64, which are attached to the object 12 and which are opposingly positioned on the object 12 along the intermediate axis of rotation 22. The third weights 64 may be selectively attachable to the object 12 and may comprise a plurality of inserts 66, each having a respective mass so that the plurality of inserts 66 comprises inserts 66 having a variety of masses. The object 12 has a pair of voids 68 extending into its exterior surface 62. The voids 68 are opposingly positioned in the object 12 along the intermediate axis of rotation 22 and are shaped complementarily to the inserts 66. Each insert 66 is selectively insertable into a respective void 68 to attach the insert 66 to the object 12 substantially flush with the exterior surface 62 of the object 12. The inserts 66 allow for selective generation of a variety of moments of inertia for the object 12 about its intermediate axis of rotation 22.

A first indicium 70 and a second indicium 72 are attached to and opposingly positioned on the object 12 along the primary axis of rotation 18. The second indicium 72 and the first indicium 70 facilitate observation of the intermittent 180° rotation of the object 12 about its primary axis of rotation 18. The first indicium 70 and the second indicium 72 typically would comprise differentially colored first attachments 54.

In use the intermediate axis theorem demonstration device 10 enables a method of demonstrating the intermediate axis theorem 74. The method 74 comprises a first step 76 of engaging an object 12 to an actuator 14. The object 12 has a primary axis of rotation 18, a secondary axis of rotation 20, and an intermediate axis of rotation 22. A moment of inertia about the intermediate axis of rotation 22 is greater than a moment of inertia about the secondary axis of rotation 20 and less than a moment of inertia about the primary axis of rotation 18.

A second step 78 of the method 74 is actuating the actuator 14 to initiate rotation of the object 12 about its intermediate axis of rotation 22. A third step 80 of the method 74 is positioning the object 12 upon a levitation module 16 to counteract a gravitational force upon the object 12. A fourth step 82 of the method 74 is releasing the object 12 from the actuator 14, whereupon the object 12 maintains a substantially fixed position relative to the levitation module 16 while rotating about its intermediate axis of rotation 22. A fifth step 84 of the method 74 is observing rotation of the object 12 about its intermediate axis of rotation 22 and intermittent 180° rotation of the object 12 about its primary axis of rotation 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An intermediate axis theorem demonstration device comprising:
   an object being substantially spherical and having:
      a primary axis of rotation;
      a secondary axis of rotation;
      an intermediate axis of rotation; and
      wherein a moment of inertia about the intermediate axis of rotation is greater than a moment of inertia about the secondary axis of rotation and less than a moment of inertia about the primary axis of rotation;
   an actuator including at least one motor being releasably engageable to the object to initiate rotation of the object about its intermediate axis of rotation;
   a levitation module that generates a column of air to counteract a gravitational force upon the object, the object being selectively positionable upon the levitation module, whereupon the object maintains a substantially fixed position relative to the levitation module while rotating about its intermediate axis of rotation; and
   wherein an observer proximate to the levitation module is positioned to observe rotation of the object about its intermediate axis of rotation and intermittent 180° rotation of the object about its primary axis of rotation.

2. The intermediate axis theorem demonstration device of claim 1, wherein:
   the primary axis of rotation is defined by a pair of first weights, the first weights of the pair of first weights being attached to the object and being opposingly positioned on the object along the primary axis of rotation; and
   the secondary axis of rotation is defined by a pair of second weights, the second weights of the pair of second weights being attached to the object and being opposingly positioned on the object along the secondary axis of rotation.

3. The intermediate axis theorem demonstration device of claim 2, wherein one or more of the first weights of the pair of first weights and the second weights of the pair of second weights is selectively attachable to the object.

4. The intermediate axis theorem demonstration device of claim 3, wherein:
   the pair of first weights comprises a plurality of first attachments, each first attachment of the plurality of first attachments having a respective mass, such that the plurality of first attachments comprises first attachments having a variety of masses; and
   the pair of second weights comprises a plurality of second attachments, each second attachment of the plurality of second attachments having a respective mass, such that the plurality of second attachments comprises second attachments having a variety of masses.

5. The intermediate axis theorem demonstration device of claim 4, wherein:
   the object has a pair of first cutouts extending into an exterior surface of the object, the first cutouts of the pair of first cutouts being opposingly positioned in the object along the primary axis of rotation, the first cutouts of the pair of first cutouts being shaped complementarily to the first attachments of the plurality of first attachments;
   each first attachment of the plurality of first attachments is selectively insertable into a respective first cutout to attach the first attachment to the object substantially flush with the exterior surface of the object;
   the object has a pair of second cutouts extending into the exterior surface, the second cutouts of the pair of second cutouts being opposingly positioned in the object along the secondary axis of rotation, the second cutouts of the pair of second cutouts being shaped complementarily to the second attachments of the plurality of second attachments; and
   each second attachment of the plurality of second attachments is selectively insertable into a respective second cutout to attach the second attachment to the object substantially flush with the exterior surface of the object.

6. The intermediate axis theorem demonstration device of claim 2, further including the intermediate axis of rotation being defined by a pair of third weights, the third weights of the pair of third weights being attached to the object and being opposingly positioned on the object along the intermediate axis of rotation.

7. The intermediate axis theorem demonstration device of claim 6, wherein:
   the third weights of the pair of third weights are selectively attachable to the object; and
   the pair of third weights comprises a plurality of inserts, each third insert of the plurality of inserts having a respective mass, such that the plurality of inserts comprises inserts having a variety of masses.

8. The intermediate axis theorem demonstration device of claim 7, further including:
the object having a pair of voids extending into an exterior surface of the object, the voids of the pair of voids being opposingly positioned in the object along the intermediate axis of rotation, the voids of the pair of voids being shaped complementarily to the inserts of the plurality of inserts; and
each insert of the plurality of inserts being selectively insertable into a respective void to attach the insert to the object substantially flush with the exterior surface of the object.

9. The intermediate axis theorem demonstration device of claim 1, wherein the object comprises a shell defining an interior space.

10. The intermediate axis theorem demonstration device of claim 9, wherein the interior space is substantially occupied by foamed elastomer.

11. The intermediate axis theorem demonstration device of claim 1, further including:
a first indicium being attached to the object on the primary axis of rotation; and
a second indicium being attached to the object on the primary axis of rotation and being opposingly positioned on the object relative to the first indicium, wherein the second indicium and the first indicium facilitate observation of the intermittent 180° rotation of the object about its primary axis of rotation.

12. The intermediate axis theorem demonstration device of claim 1, wherein the levitation module comprises:
a blower; and
a tube attached to and extending perpendicularly and upwardly from the blower, such that the air column is directed from the tube onto the object.

13. The intermediate axis theorem demonstration device of claim 1, further including:
the actuator comprising a pair of motors attached to and positioned above the levitation module, each motor having a shaft, the shaft being selectively extensible from the motor;
a pair of bits, the bit of the pair of bits being attached to singly to the shafts distal from the motors;
the object having a pair of slots extending into an exterior surface of the object, the slots of the pair of slots being opposingly positioned in the object along the intermediate axis of rotation, the slots of the pair of slots being shaped complementarily to the bits of the pair of bits;
wherein rotation of the object about its intermediate axis of rotation is achieved by extension of the shafts with insertion of the bits into the slots, actuation of the motors, and retraction of the shafts; and
whereupon the object maintains the substantially fixed position relative to the levitation module while rotating about its intermediate axis of rotation with intermittent 180° rotation of the object about its primary axis of rotation.

14. The intermediate axis theorem demonstration device of claim 9, wherein:
the levitation module comprises:
a blower;
a tube attached to and extending perpendicularly and upwardly from the blower, wherein the blower generates an air column to counteract the gravitational force upon the object; and
a pair of brackets extending upwardly from a top of the tube, the brackets of the pair of brackets being opposingly positioned on the tube, each bracket of the pair of brackets having a hole positioned therein;
the actuator comprises:
a pair of motors, the motors of the pair of motors being attached singly to the brackets of the pair of brackets, such that each bracket has a motor attached to an outer face of the bracket, each motor of the pair of motors having a shaft, the shaft being selectively extensible from the motor through the hole in the bracket; and
a pair of bits, the bit of the pair of bits being attached to singly to the shafts distal from the motors;
the object having a pair of slots extending into an exterior surface of the object, the slots of the pair of slots being opposingly positioned in the object along the intermediate axis of rotation, the slots of the pair of slots being shaped complementarily to the bits of the pair of bits; and
wherein rotation of the object about its intermediate axis of rotation is achieved by extension of the shafts with insertion of the bits into the slots, actuation of the motors, and retraction of the shafts; and
whereupon the object maintains the substantially fixed position relative to the levitation module by action of the air column directed from the tube onto the object while the object rotates about its intermediate axis of rotation with intermittent 180° rotation about its primary axis of rotation.

15. A method of demonstrating the intermediate axis theorem comprising the steps of:
engaging an object being substantially spherical to an actuator including at least one motor, the object having:
a primary axis of rotation;
a secondary axis of rotation;
an intermediate axis of rotation; and
wherein a moment of inertia about the intermediate axis of rotation is greater than a moment of inertia about the secondary axis of rotation and less than a moment of inertia about the primary axis of rotation;
actuating the actuator to initiate rotation of the object about its intermediate axis of rotation;
positioning the object upon a levitation module that generates a column of air to counteract a gravitational force upon the object;
releasing the object from the actuator, whereupon the object maintains a substantially fixed position relative to the levitation module while rotating about its intermediate axis of rotation; and
observing rotation of the object about its intermediate axis of rotation and intermittent 180° rotation of the object about its primary axis of rotation.

* * * * *